Sept. 20, 1971  C. J. EVANS  3,606,471
TRENCHING DEVICES

Filed March 25, 1969  2 Sheets-Sheet 1

INVENTOR
CLIFFORD J. EVANS

Jack A Kang
ATTORNEY

Sept. 20, 1971   C. J. EVANS   3,606,471
TRENCHING DEVICES
Filed March 25, 1969   2 Sheets-Sheet 2

INVENTOR
CLIFFORD J. EVANS

*Jack A Kanz*
ATTORNEY

United States Patent Office 3,606,471
Patented Sept. 20, 1971

3,606,471
TRENCHING DEVICES
Clifford J. Evans, Glen Rose, Tex., assignor to
Jetco, Inc., Alhambra, Calif.
Filed Mar. 25, 1969, Ser. No. 810,214
Int. Cl. E21c 37/18; E02f 9/28
U.S. Cl. 299—79                                          4 Claims

ABSTRACT OF THE DISCLOSURE

A curved tooth for use on a moving excavation apparatus having a tapered contact point of hardened material which is about one-half to one-fourth the width of the shank portion of the body of the tooth, the thickness of the digging portion being non-tapering and at least as thick as the shank portion of the body.

---

This invention relates to excavation equipment and more particularly to trenching devices of the type utilizing a series of buckets attached to an endless chain or the circumference of a large diameter wheel or drum. More particularly, it relates to teeth or claws mounted on the leading edges of such buckets which aid in the breaking and fragmentation of hard materials such as rock, sandstone, hard clay and the like commonly encountered in the use of such excavation equipment.

The use of cutting teeth spaced along the leading edge of excavation buckets is known to materially aid in fracturing and fragmenting hard substances, thus has become widely used in the industry. Such teeth are generally mounted on the front and/or sides of the buckets extending approximately two to six inches from the lip thereof. However certain difficulties have been encountered in the use of such teeth. For example, the teeth are subject to extensive wear and breakage and must be frequently replaced. Replacement of such teeth is sometimes a difficult and time consuming job, thus reducing the effective production time of the trencher. Furthermore, conventional teeth are found somewhat ineffective when digging in hard rock, sandstone, or extremely hard clays.

In accordance with this invention, unique means of attaching teeth to the excavation buckets is provided which substantially reduces the time required to replace broken, worn or damaged teeth. Also a new tooth design is provided which incorporates a digging point of extremely hard material supported by a strengthened tooth structure. The invention also provides unique positioning and spacing teeth of different structure on the leading edges of a series of buckets in such a manner that digging effectiveness of the apparatus is substantially increased.

Figure 5:
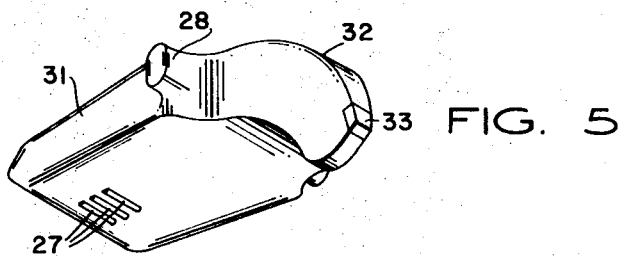
Figure 1:
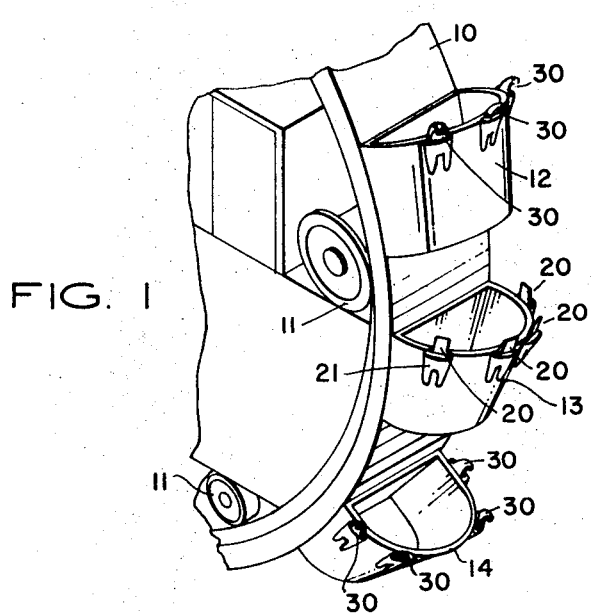
Figure 3:
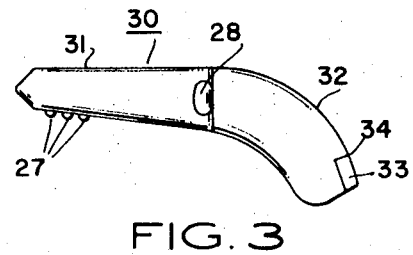
Figure 4:
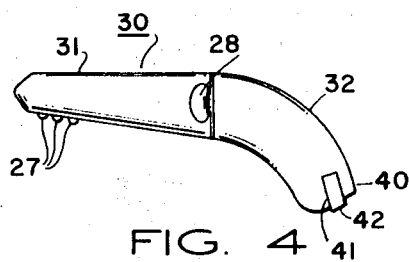
Figure 2:
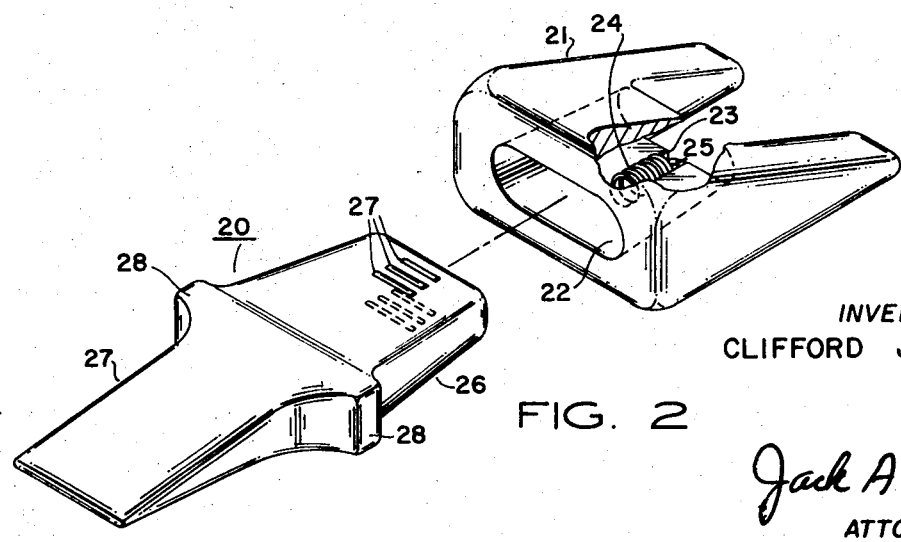
Figure 6:
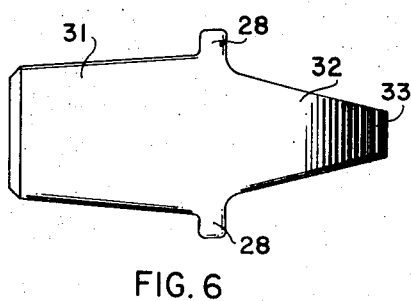
Figure 7A:
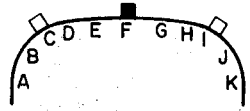
Figure 7B:
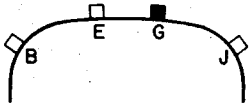
Figure 7C:
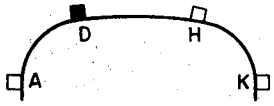
Figure 7D:
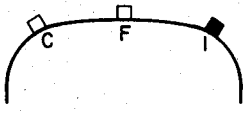
Figure 7E:
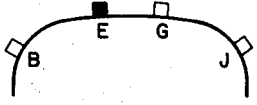
Figure 7F:
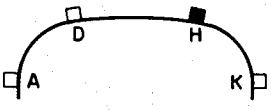
Figure 7G:
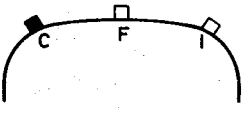
Figure 7H:
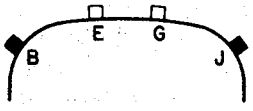
Figure 7I:
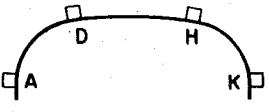
Figure 8A:
Figure 8B:
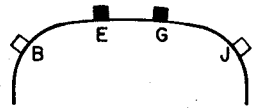
Figure 8C:
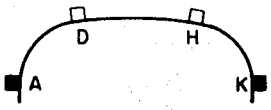
Figure 8D:
Figure 8E:
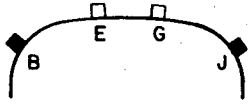
Figure 8F:
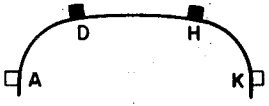

It is therefore an object of the invention to provide apparatus for detachably securing teeth to the leading edges of trenching buckets so that said teeth are firmly secured yet quickly and easily replaceable. A further object is to provide a new and improved trenching tooth which effectively fractures hard formations such as rock, sandstone and the like for excavation with otherwise conventional trenching apparatus, and to provide a trenching tooth which is extremely resistant to wear and breakage. A further object is to provide a digging tooth of unique structure which provides greater penetration into hard formations and to provide arrangements of digging teeth along the leading edges of a series of excavation buckets in such a manner as to increase the digging effectiveness of conventional trenching apparatus. These and other objects, features and advantages will become more readily understood from the following detailed description taken in connection with the appended claims and attached drawings in which:

FIG. 1 is a fragmentary pictorial view of a section of a conventional trenching apparatus employing the improved digging teeth and arrangement thereof, FIG. 2 is a pictorial view, partially in section, of one embodiment of the invention showing a mounting lug for mounting said tooth on conventional excavation apparatus, FIG. 3 is a side view of another embodiment of the improved tooth of the invention, FIG. 4 is a side view of another embodiment of the improved tooth of FIG. 3, FIG. 5 is a perspective view of the tooth shown in FIG. 3, FIG. 6 is a top view of the tooth shown in FIG. 3, and FIGS. 7A–I and 8A–F are schematic representations of the arrangement of conventional digging teeth and the improved digging tooth of this invention in a conventional trenching apparatus to utilize the advantages of the improved tooth of this invention.

Referring now to FIG. 1 there is depicted a fragmentary portion of a conventional trenching device comprising a substantially circular wheel 10 adapted for rotation about its axis and supported by a plurality of rollers 11 adjacent its inner diameter. Attached to the outer surface of the wheel 10 are a plurality of buckets 12, 13 and 14. The wheel 10 and supporting rollers 11 are conventionally mounted on a vehicle (not shown) which moves and rotates the wheel 10 by conventional means. Description of the mounting, transporting and power means are omitted since they form no part of this invention.

Attached to the forward edges of buckets 12, 13 and 14 and extending upwardly or forwardly from the leading edges thereof are a series of excavation teeth 20 and 30.

When the excavation device of FIG. 1 is operated in the conventional manner, wheel 10 is lowered into contact with the earth. As the wheel is rotated excavation teeth 20, extending upwardly from the leading edge of the buckets, are urged against the material to be excavated. As the wheel is rotated the teeth fracture and fragment the earth which then falls into the buckets. As the buckets are rotated upwardly the material is carried from the trench. The excavated material is then allowed to fall through the wheel from the back of the buckets as the buckets pass over the top of the wheel. The material is then carried away from the excavation site by a suitable means such as a conveyor or the like.

It will be readily apparent that the excavation teeth 20 are subjected to severe stresses and strains when the formation being excavated is of a hard nature such as rock, sandstone, hard clay, hard frost and the like. Furthermore, when excavating such hard materials, teeth 20 are frequently damaged by breakage as well as excessive wear. Since the excavation teeth are generally placed in like positions on all of the series of buckets, the teeth on one bucket may form a series of grooves in the excavation site which are then followed by the teeth in the following bucket without further fragmentation or breaking up of the hard fromation. Furthermore, since conventional digging teeth generally extend forward in substantially the same plane as the leading edge of the buckets and are substantially parallel to other teeth in the same bucket, conventional teeth generally fail to effectively penetrate hard formations. In such situations, the trencher may be quite ineffective in forming suitable excavations.

In accordance with one aspect of the invention, an improved excavation tooth is provided which may be substituted for one or more of the conventional excavation teeth. The improved tooth is designed to penetrate deeper into the excavation site than the conventional teeth, thus ripping and fracturing the hard formation so that the following conventional teeth may penetrate the formation.

In accordance with another aspect of the invention, an improved means for detachably securing excavation teeth of the conventional type as well as the improved type is provided.

The improved means for removeably attaching excavation teeth to the leading edge of the excavation buckets is illustrated in FIG. 2. The improved means comprises a lug or bracket 21 adapted to be secured to the edge of the excavation bucket as by welding. The lug has a tapered cavity 22 adapted to substantially conform to the outer dimensions of the tapered end 26 of excavation tooth 20. On at least one side of the tapered cavity 22 and near the bottom thereof is provided a slot 23. A compressible locking means such as coil spring 24 is positioned in slot 23 and secured by locking pin 25. Compressible locking means 24 is slightly larger than groove 23 and therefore extends slightly into the cavity 22 in locking lug 21. A plurality of ridges 27 are provided on at least one surface of the bottom end 26 of tooth 20. Ridges 27 are preferably substantially perpendicular to the long axis of the tooth and need extend no more than about one-tenth of an inch from the flat surface of the shank 26. A single ridge 27 may satisfactorily perform the function desired, depending on the structure of locking means 24, however, a plurality of ridges is preferred. Ridges 27 may be integrally formed as part of the shank structure, or may be added to previously flat shanks by welding or the like. Likewise, ridge structure can be provided by forming grooves in the shank rather than ridges extending from the shank. Such grooves may be formed in the tooth as produced or may be formed in flat shanks by machining or the like. A combination of ridges and grooves may also be used to provide the structure contemplated by the invention. Referring to FIG. 2, it will be seen that when shank end 26 of tooth 20 is mated with cavity 22, ridges 27 slide over the coils of spring 24 and become firmly lodged between the coils. In this manner tooth 20 is securely lodged within the cavity 22. The tooth may be conveniently and quickly removed, however, by striking ears 28 which project laterally from the central portion of the tooth from the back with a hammer or the like.

Except for ridges 27, tooth 20 typifies conventional excavation teeth. The conventional tooth is generally of cast or forged steel and comprises a tapered shank 26 and a digging portion 27. Tapered shank 26 is adapted to fit cavity 22 in the lug 21. The digging end 27 of tooth 20 is also tapered and is generally thinner than the center portion and shank 26. The width of the digging end is approximately the same as that of the shank.

Since the conventional tooth is essentially straight in design, it may be considered reversible. Thus the tooth may be inserted into lug 21 in the position shown in FIG. 2, or may be rotated 180° about its longest axis. Accordingly, ridges 27 may be conveniently placed on both flat sides of the shank as indicated and the ridges utilized in connection with the locking means 25 regardless of the position in which tooth 20 is inserted into the lug 21.

Another embodiment of the improved tooth is shown in FIGS. 3 and 5. The improved tooth 30 comprises a tapered shank portion 31 adapted to be securely fitted in a receptacle or bracket such as 21 shown in FIG. 2. In all respects the shank portion of the tooth of FIG. 3 may be identical to the shank portion of tooth 20 shown in FIG. 2. However, the digging end 32 of tooth 30 is substantially thicker than shank 31 and curves outwardly from the plane of shank 31. Furthermore, the digging end 32 is substantially narrower in the transverse plane than shank end 31.

Since the improved tooth 30 is curved, the digging end 32 deviates substantially from the plane of conventional teeth in the same bucket. Curved teeth therefore are not reversible. Ridges 27, accordingly, need only be formed on the side which will engage the locking means 27 when properly inserted in the lug 21.

When improved tooth 30 is mounted on the leading edge of the excavation bucket 12 as shown in FIG. 1, the curved portion 32 of tooth 30 extends outwardly from the plane of the conventional teeth 20. Accordingly, curved tooth 30 penetrates deeper into the material being excavated than the conventional teeth on the following bucket 13, thus breaking and fracturing hard substances such as sandstone and the like so that the following conventional teeth and buckets can penetrate the formation and remove the fractured material from the excavation.

Since the curved portion 32 of tooth 30 extends outwardly from the plane of the conventional teeth 20 and penetrates deeply into the excavation site, tooth 30 is subjected to extremely high stresses and strains. Accordingly, curved portion 32 is made substantially thicker to reinforce the curved portion, and tapered in the horizontal plane so as to present a relatively small finger or spike which is urged into the hard material as shown in FIGS. 5 and 6. By tapering the digging end to a point, the force applied per area of contact is much greater than the force per area applied by conventional teeth, thus providing greater penetration and fracturing of hard formations.

The digging end is generally tapered to a point which is about one-half to one-fourth the width of the shank. In the preferred embodiment the end of the finger portion 32 is approximately one-third the width of the shank, and the leading edge thereof is protected with a material 33 of extreme hardness. In the embodiment shown in FIG. 3, a notch 34 is formed in the end of tooth 32 and a tip of extremely hard material such as tungsten carbide brazed or otherwise secured to the end 32 of the tooth 30 in the notch 34. Accordingly, as the tooth 30 is urged into and through the hard material, the hard carbide tip 33 engages the material being fractured and excavated.

By providing an extremely hard tip such as tungsten carbide tip 33 on the end of tooth 30, wear of the tooth 30 is substantially reduced.

An alternative embodiment of improved tooth 30 is shown in FIG. 4. In the alternative embodiment a lateral slot or groove 41 is formed in the forward end of curved portion 32 of tooth 30 substantially perpendicular to the long axis of the tooth. Groove 31 extends laterally across the entire forward end of tooth 30 at approximately the center of the point. A hard material 42 such as tungsten carbide is permanently affixed within the groove and allowed to extend slightly from the end of slot 41 as shown in FIG. 4.

Carbides such as tungsten carbide, although extremely hard, are somewhat brittle. Therefore by placing the carbide material 42 within slot 21, only the forward edge of the carbide material extends from the end of the tooth. The forward lip 40 of the tooth, being of softer material such as forged steel, protects the carbide 42 from shock and impact when digging in extremely hard materials, thus preventing cracking and breaking of the hard material 42. However, the end portion of 42 extending from the tooth still provides a sharp, hard, wear resistant cutting edge. Furthermore, it will be observed that as the lip 40 wears away from continued use, the carbide insert 42 will continue to be slightly exposed from the end of the tooth providing a sharp cutting edge while still being partially protected from impact by the lip 40.

While the curved tooth 30 has been described with particular reference to the use of a tungsten carbide tip welded in a slot in the tooth, other means for providing hard surfaces may be used. For example, other hard materials such as carbides or nitrides may be used as the hard material, and may be formed on the curved end by such means as vapor plating, coating or other methods of hardening the tooth.

Commercially available materials such as cobalt alloys of tungsten carbide have been found suitable for use as the hard tip and are readily attached to the tooth by brazing. Other materials having hardness greater than the steel ordinarily employed in the tooth may also be used.

Use of the improved excavation tooth described hereinabove in connection with otherwise conventional trenching apparatus is schematically depicted in FIGS. 7 and 8. The illustration of FIG. 7 illustrates a series of nine buckets each having three or four teeth. For purposes of illustration potential positions of the teeth in each bucket are labeled as positions A, B, C, D, E, F, G, H, I, J and K. Accordingly, position F indicates the center position on the bucket. The positions occupied by curved teeth (such as tooth 30 in FIG. 3) are shaded; conventionally straight teeth being unshaded. In the illustration shown in FIG. 6, one curved tooth is placed on bucket 1 in position F and positions C and I are occupied by straight teeth. In bucket 2 position G is occupied by the curved tooth and positions B, E and J occupied by straight teeth. Likewise, in each bucket in the progression the curved tooth is located at a different position and other positions occupied by conventionally straight teeth. Note that in bucket 8 two teeth of the improved curved type are used, one in position B and one in position J; and that bucket 9, immediately following bucket 8, has only conventionally straight teeth.

FIG. 8 illustrates an alternative method of utilizing the improved curved tooth of the invention. FIG. 8 depicts a series of six buckets, each having a maximum of eleven teeth positions. All buckets in the progression of FIG. 8, except bucket 1, have two improved curved teeth placed in opposite symmetrical positions on the bucket. Bucket 1 has only a single tooth of the improved type placed at the center position, and two substantially straight teeth positioned symmetrically on opposite sides of the curved tooth. The second bucket has a pair of curved teeth positioned symmetrically about the center position and two straight teeth positioned symmetrically on opposite sides of the pair of curved teeth. Bucket number 3 has a pair of straight teeth positioned symmetrically about the center of the bucket. The straight teeth of bucket 3 are spaced further apart than the curved teeth of bucket number 2. Curved teeth are positioned on the sides at positions A and K.

The fourth bucket has teeth in the same positions as bucket number 1, however, the location of curved and straight teeth is reversed. Likewise, buckets number 5 and 6 have teeth in the same positions as buckets 3 and 4, respectively, with the location of curved and straight teeth reversed.

Still another arrangement of curved and straight teeth is illustrated in FIG. 1. Buckets 12 and 14 contain three and four curved teeth 30, respectively, and bucket 13 has only four straight teeth. The first and third buckets following bucket 14 would preferably have three and four straight teeth, respectively, and the second bucket following bucket 14 would have four curved teeth.

While FIGS. 1, 7 and 8 illustrate the use of the improved curved tooth in excavation equipment using nine and six buckets, respectively, with eleven potential tooth positions on each bucket, it will be readily understood that identical distribution of teeth can be utilized in either wheel type or continuous chain excavation equipment using nine or six buckets, respectively, or even multiples of six or nine. When curved teeth are used on buckets in chain ladder excavation equipment, care should be taken to place curved and straight teeth symmetrically about the center of the bucket to avoid excessive side drag. Non-symmetrical placement, such as that shown in FIG. 6, may be best suited for wheel equipment.

From the foregoing it will be readily apparent that the improved excavation tooth described herein will vastly increase the utility of conventional trenchers by providing deep penetration of hard formations. Furthermore, the improved tooth may be firmly detachably affixed to the excavation buckets in accordance with the principles disclosed.

While the invention has been described with particular reference to specific embodiments thereof, the forms of the invention shown and described in detail are to be taken as preferred embodiments of same, and that various changes and modifications may be resorted to without departing from the spirit and scope of the invention.

What is claimed is:

1. A tooth for mounting on a moving excavation apparatus comprising:
   a metallic body, one end of said body forming a shank portion adapted for mating with receptacle means for mounting said tooth on said excavation apparatus, the other end of said body forming a digging portion which is curved from the plane of said shank portion,
   a contact area formed on the concave digging portion of said tooth for contacting the material to be excavated and for increasing the contact pressure between said digging portion and said material to be excavated, said area varying in width and tapering to a point which is about one-half to one-fourth the width of the shank portion of said body, the thickness of said digging portion of the tooth being non-tapering and at least as thick as the shank portion of the body, and
   tip means affixed to the digging portion of said body and having a greater hardness than said tooth.

2. A tooth as defined in claim 1 wherein said tip means is mounted in a notch in said digging portion.

3. A tooth as defined in claim 1 wherein said tip means is made from a tungsten carbide alloy.

4. A tooth as defined in claim 1 wherein said tip is mounted on the convex side of said tooth.

References Cited

UNITED STATES PATENTS

| | | | |
|---|---|---|---|
| 1,978,733 | 10/1934 | Yooum | 37—141T |
| 2,971,280 | 2/1961 | Smedley | 37—142 |

FOREIGN PATENTS

| | | | |
|---|---|---|---|
| 846,615 | 8/1960 | Great Britain | 299—79 |

ERNEST R. PURSER, Primary Examiner

U.S. Cl. X.R.

37—142